US012769051B2

(12) United States Patent
May et al.

(10) Patent No.: US 12,769,051 B2
(45) Date of Patent: Oct. 20, 2026

(54) DIRECTLY COUPLED OPTICAL INTERPOSER

(71) Applicant: Intel Corporation, Santa Clara, CA (US)

(72) Inventors: Robert A. May, Chandler, AZ (US); Tarek Ibrahim, Mesa, AZ (US); Shriya Seshadri, Chandler, AZ (US); Kristof Darmawikarta, Chandler, AZ (US); Hiroki Tanaka, Gilbert, AZ (US); Changhua Liu, Chandler, AZ (US); Bai Nie, Chandler, AZ (US); Lilia May, Chandler, AZ (US); Srinivas Pietambaram, Chandler, AZ (US); Zhichao Zhang, Chandler, AZ (US); Duye Ye, Phoenix, AZ (US); Yosuke Kanaoka, Chandler, AZ (US); Robin McRee, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 17/957,341

(22) Filed: Sep. 30, 2022

(65) Prior Publication Data

US 2024/0111090 A1 Apr. 4, 2024

(51) Int. Cl.

*G02B 6/12* (2006.01)
*G02B 6/13* (2006.01)
*G02B 6/42* (2006.01)

(52) U.S. Cl.

CPC ........... *G02B 6/12004* (2013.01); *G02B 6/13* (2013.01); *G02B 2006/12171* (2013.01)

(58) Field of Classification Search

CPC .. G02B 6/12002; G02B 6/12004; G02B 6/42; G02B 6/4201; G02B 6/4219

See application file for complete search history.

(56) References Cited

U.S. PATENT DOCUMENTS

| | | | | |
|---|---|---|---|---|
| 3,777,154 | A * | 12/1973 | Lindsey | G02B 6/43 250/553 |
| 5,521,992 | A * | 5/1996 | Chun | G02B 6/43 257/734 |
| 5,780,875 | A * | 7/1998 | Tsuji | G02B 6/4246 385/83 |
| 6,477,286 | B1 * | 11/2002 | Ouchi | G02B 6/10 257/433 |

(Continued)

*Primary Examiner* — Michael Stahl

(74) *Attorney, Agent, or Firm* — Essential Patents Group, LLP

(57) ABSTRACT

A device comprises a substrate and an IC die, which may be a photonic IC. The substrate comprises a first surface, a second surface opposite the first surface, an optical waveguide integral with the substrate, and a hole extending from the first surface to the second surface. The hole comprises a first sidewall. The optical waveguide is between the first surface and the second surface, parallel to the first surface, and comprises a first end which extends to the first sidewall. The IC die is within the hole and comprises a second sidewall and an optical port at the second sidewall. The second sidewall is proximate to the first sidewall and the first end of the optical waveguide is proximate to and aligned with the optical port. The substrate may include a recess to receive another device comprising a socket.

17 Claims, 11 Drawing Sheets

(56) References Cited

U.S. PATENT DOCUMENTS

| | | | | |
|---|---|---|---|---|
| 6,768,826 | B2 * | 7/2004 | Ayadi | G02B 6/4249 385/14 |
| 2004/0001661 | A1 * | 1/2004 | Iwaki | G02B 6/43 385/14 |
| 2007/0183718 | A1 * | 8/2007 | Bae | G02B 6/12004 385/47 |
| 2009/0169219 | A1 * | 7/2009 | Nakano | G02B 6/43 398/200 |
| 2014/0056554 | A1 * | 2/2014 | Brunner | G02B 6/125 65/378 |
| 2014/0334768 | A1 * | 11/2014 | Chang | G02B 6/12 438/27 |
| 2020/0411587 | A1 * | 12/2020 | Pezeshki | G02B 6/43 |
| 2021/0041649 | A1 * | 2/2021 | Brusberg | G02B 6/4281 |

* cited by examiner

DIRECTLY COUPLED OPTICAL INTERPOSER

BACKGROUND

An electronic integrated circuit (IC) is a set of electronic circuits in a die or chip comprised of a semiconductor material, e.g., silicon. An electronic IC includes electrical devices, such as transistors, metal interconnects, and electrical insulators. A photonic integrated circuit (PIC) is similar to an electronic IC except that it includes a set of photonic devices or elements in a die or chip. A PIC die may be comprised of silicon or various other materials. While a PIC includes various optical components, such as waveguides, optical amplifiers, optical modulators, filters, lasers and optical detectors, PICs may also include electrical devices or elements in addition to optical components.

An IC package or other assembly may include multiple electronic ICs, such as processor, logic, or memory circuit ICs, and may be electrically and physically connected to a printed circuit board or other host carrier. In addition, an IC package may include one or more PICs interconnected with the electronic ICs.

Coupling PICs with electronic ICs in an IC package or with other devices off package involves a variety of manufacturing challenges.

BRIEF DESCRIPTION OF THE DRAWINGS

The subject matter described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
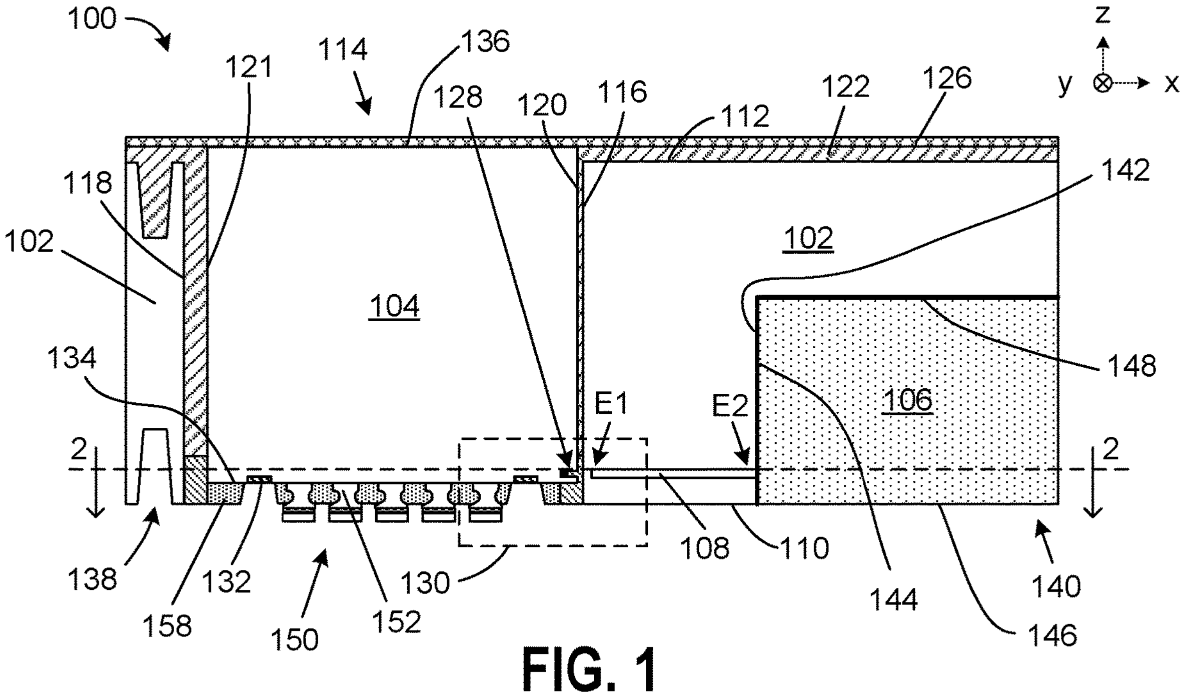
FIG. 1 is a cross-sectional side view of an optical interposer comprising a photonic integrated circuit (PIC) and a fiber array unit (FAU) socket according to an embodiment.

Embodiments are directed to an optical interposer package or assembly comprising a substrate, a PIC, and a pluggable optical connector that connects to an array of waveguides within the substrate.

Embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or functional changes may be made without departing from the scope of claimed subject matter. It should also be noted that directions and references (e.g., up, down, top, bottom, etc.) may be used merely to facilitate the description of features in the drawings and relationship between the features. Therefore, the following detailed description is not to be taken in a limiting sense and the scope of claimed subject matter is defined solely by the appended claims and their equivalents.

In the following description, numerous details are set forth. However, it will be apparent to one skilled in the art, that embodiments may be practiced without these specific details. In some instances, well-known methods and devices are shown in block diagram form, rather than in detail, to avoid obscuring the embodiments. Reference throughout this specification to "an embodiment" or "one embodiment" or "some embodiments" means that a particular feature, structure, function, or characteristic described in connection with the embodiment is included in at least one embodiment. Thus, the appearances of the phrase "in an embodiment" or "in one embodiment" or "some embodiments" in various places throughout this specification are not necessarily referring to the same embodiment. Furthermore, the particular features, structures, functions, or characteristics may be combined in any suitable manner in one or more embodiments. For example, a first embodiment may be combined with a second embodiment anywhere the particular features, structures, functions, or characteristics associated with each of the two embodiments are not mutually exclusive.

As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

The terms "over," "under," "between," and "on" as used herein refer to a relative position of one component or material with respect to other components or materials where such physical relationships are noteworthy. For example, in the context of materials, one material or structure disposed over or under another may be directly in contact or may have one or more intervening materials. Moreover, one material disposed between two materials may be directly in contact with the two materials or may have one or more intervening materials. In contrast, a first material or structure "on" a second material or structure is in direct contact with that second material/structure. Similar distinctions are to be made in the context of component assemblies where a first component may be "on" or "over" a second component.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The IC package examples described herein may be manufactured, in part, with bonding techniques in which metal features embedded within an insulator of one IC die are directly fused to metal features embedded within an insulator of another die. Where both the metal features and the insulators are fused, the resultant composite structure comprises a hybrid bonded interface of both metallurgically interdiffused metals and chemically bonded insulators. Prior to bonding, each IC die may be fabricated in a monolithic process separate from that of the other IC die. As such, an IC die may utilize the same or different semiconductor device fabrication technologies as the IC die to which it is bonded. These bonding techniques may be referred to as "hybrid" or "direct" bonding.

The phrase an integrated circuit (IC) die, as used herein, refers to either, or both, an electronic IC and a PIC.

One challenge that arises when manufacturing an IC package that includes both an electronic IC and a photonic integrated circuit (PIC) is aligning the PIC's optical input/output (I/O) ports with optical interconnects to other devices. For example, optical fiber may be used as an interconnect. In these packages, v-grooves are etched in a substrate, such as a silicon substrate, with an end of each v-groove proximate to one of the optical ports of a PIC. An optical fiber is placed in each groove. The optical fiber may have a diameter on the order of 125 microns. Each optical fiber must be aligned with an optical I/O port of the PIC within a particular tolerance, however, the v-grooves may not provide alignment within sufficient tolerance. To determine if the optical fiber is properly aligned, a test signal is provided to the optical fiber or optical port. If the test signal associated with any of the optical fibers is not received within a required specification, small adjustments to the position of the end of the optical fiber are made until the test signal is received within the specification. This "active" testing-and-position-adjusting process is time consuming Moreover, a PIC may have 16 or 24 optical ports, and the testing-and-position-adjusting process must be performed for each port, which makes for a lengthy overall process.

Another challenge that arises when manufacturing an IC package that includes a PIC is that it may not be known that the PIC is defective until the IC package as a whole is tested. For example, an IC package may include processor and memory ICs, a PIC, and a substrate. If testing of the package indicates that the PIC is defective, the entire package may need to be discarded, even though the processor, memory, and substrate are operable. Yet another challenge that arises when manufacturing an IC package that includes a PIC is that special assembly techniques for optical components may be required.

Embodiments are directed to a package or assembly that includes a substrate, a PIC, and a pluggable optical connector that connects to an array of waveguides within the substrate. This optical interposer assembly is suitable for testing, so that "known good" PIC packages can be identified prior to placement in larger IC packages. The assembly is scalable because it provides a pluggable connection to an array of waveguides rather than individual optical fiber-to-fiber connections that require active, individual alignment.

An advantage of various embodiments is that optical interconnects may be aligned with high precision with the optical ports of the PIC. In addition, in comparison to methods in which optical fiber is placed in a v-groove, various embodiments advantageously do not require the time-consuming testing-and-position-adjusting process for each individual interconnect. Yet another advantage is that an optical interposer assembly according to various embodiments may be tested as a unit, allowing only "known-good" PICs to be used when assembling an IC package. A further favorable feature of using an optical interposer assembly according to various embodiments is that IC package may be assembled without special assembly techniques typically required for optical components.

A further advantage of various embodiments is that the assembly process for incorporating an optical interposer into an IC package may be compatible with existing manufacturing processes because the optical interposer comprises a thermal path. Embodiments of an optical interposer assembly include a thermally conductive layer or layers which are accessible to a heat source. The thermally conductive layers provide a direct thermal path between solder features of first level interconnects and a heat source, which permits existing techniques for attaching a device to a substrate to be used.

FIG. 1 is a cross-sectional side view of an optical interposer 100 comprising a substrate 102, photonic integrated circuit (PIC) 104, and a fiber array unit (FAU) 106, and at least one optical waveguide 108 integral with the substrate according to an embodiment. The substrate 102 may comprise various types of material, including fused silicon or borosilicate glasses. In various embodiments, substrate 102 comprises a patterned glass. The substrate 102 includes a first surface 110, which faces down in FIG. 1, a second surface 112 opposite the first surface, and a hole 114 extending from the first surface 110 to the second surface 112. The hole 114 includes a first sidewall 116 and another sidewall 118 opposite the first sidewall. The PIC 104 is within the hole 114, includes a second sidewall 120, and another sidewall 121 opposite the second sidewall. The first sidewall 116 of the hole 114 is proximate to the second sidewall 120 of the PIC 104.

Mold material 122 may also be in the hole 114 along sides of PIC 104. The mold material 122 may be on the second surface 112 of substrate 102 and between the PIC 104 and sidewalls 116, 118 of the hole 114. More specifically, the mold material 120 may be between the first sidewall 116 and second sidewall 120, and between sidewall 118 of hole 114 and sidewall 121 of PIC 104. Optical interposer 100 may optionally include a back-side metallization layer 126, and in some embodiments, the mold material 122 is between the substrate 102 and the back-side metallization layer 126. It should be noted that mold material 122 is not present on fourth surface 136 of PIC 104.

The PIC 104 includes at least one optical port 128 at the second sidewall 120. In various embodiments, PIC 104 includes a plurality of optical ports 128, e.g., 16 or 24 ports. The substrate 102 includes at least one optical waveguide 108. In various embodiments, substrate 102 includes a plurality of optical waveguides 108, e.g., 16, 24. In various embodiments, each optical port 128 of PIC 104 is directly coupled to one of the waveguides 108 and each waveguide connects to a pluggable interface of the FAU 106. More specifically, a first end E1 of each optical waveguide 108 is proximate to and aligned with one of the optical ports 128.

During manufacture of optical interposer 100, PIC 104 is placed within the hole 114 and secured so that its position is fixed relative to substrate 102. Optical waveguides 108 may then be written in the substrate 102 with a laser tool which has data for position the PIC 104. Each optical waveguide 108 includes a first end E1 which extends to the first sidewall 116 of substrate 102 and a second end E2 which extends to the FAU 106. Each optical waveguide 108 may be substantially parallel to the first surface 110 of substrate 102, although this is not critical. The optical waveguides 108 are written at a depth between the first surface 110 and second surface 112 such that each waveguide 108 is vertically aligned (along the z-axis) with one of the optical ports 128 within portion 130 of optical interposer 100. Moreover, each optical waveguide 108 is written at a location in the x-y plane such that the waveguides 108 are horizontally aligned (in the x-y plane) with one of the optical ports 128. Because the waveguides written into the substrate after the PIC 104 is fixedly placed, using positional data for the PIC 104, the resulting waveguides 108 are aligned with the optical ports 128 of the PIC 104 and are integral with the substrate 102. In an embodiment, a centerline of optical waveguide 108 is laterally aligned with a centerline of the optical port 128 within approximately +/−1.5 μm, and a centerline of the optical waveguide 108 is vertically aligned with the centerline of the optical port 128 within approximately +/−1.5 μm, wherein a cross-sectional diameter of a waveguide is approximately 10 μm.

The optical interposer 100 may include a variety of fiducial markers at various locations that may be used to determine the position PIC 104 relative to substrate 102. In some embodiments, PIC 104 includes one or more first fiducial markers 132 at a third surface 134. The second sidewall 120 may be substantially orthogonal to the third surface 134. In addition, PIC 104 includes a fourth surface 136 opposite the third surface 134. In some embodiments, substrate 102 includes one or more second fiducial markers 138, which may be at first surface 110 or second surface 112.

The substrate 102 may include a recess 140 at the first surface 110 to receive another device, e.g., FAU 106. In various embodiments, FAU 106 or another suitable device is within the recess 140. The recess 140 includes a third sidewall 142, which may be substantially parallel to first sidewall 116 of substrate 102. In some embodiments, the third sidewall 142 comprises the second end E2 of an optical waveguide 108. A fourth sidewall 144 of the FAU 106 is proximate to and may contact the third sidewall 142 of substrate 102. In various embodiments, FAU 106 comprises a bottom surface 146 and a top surface 148 opposite fourth surface 146. The bottom surface 146 is orthogonal to the fourth sidewall 144. In addition, the FAU 106 or other suitable device may include a first optical interface, a second optical interface, and an interconnect (not shown in FIG. 1) coupling the first optical interface with the second optical interface. The first optical interface may be at the fourth sidewall 144 and proximate to the second end E2 of optical waveguide 108. The second optical interface comprises a connector, which may be at any surface of FAU 106. As further described elsewhere herein, the second optical interface of FAU 106 may include a socket to receive an optical plug or an optical plug for insertion into a socket.

In various embodiments, the PIC 104 may include first level interconnects (FLI) or hardware interface 150 comprising a plurality of electrically conductive contacts 152 at third surface 134. As noted above, third surface 134 is opposite fourth surface 136 and orthogonal to the second sidewall 120.

Figure 2:
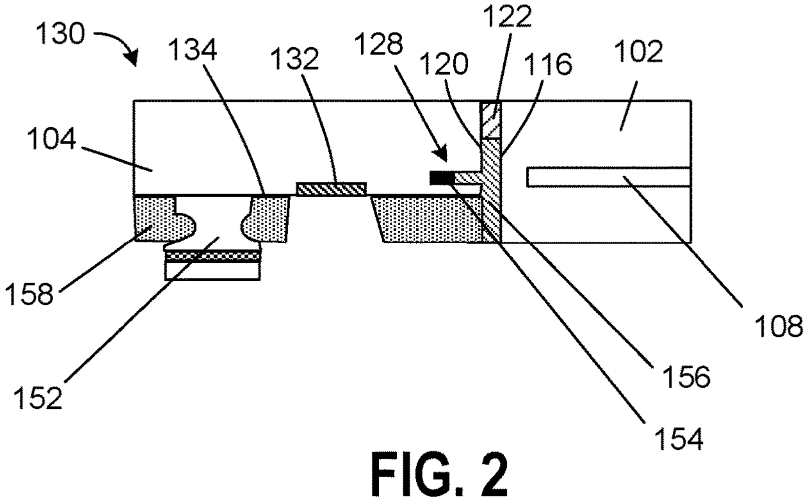
FIG. 2 is a portion of the view of the cross-sectional view of FIG. 1, enlarged for magnification purposes, according to an embodiment.

FIG. 2 is portion 130 of the view of the cross-sectional view of FIG. 1, enlarged for magnification purposes, according to an embodiment. The optical port 128 may be a cavity comprising a low numerical aperture (LNA) material in a region 154 at an end where an optical signal is emitted from PIC 104. In some embodiments, region 154 comprises an optical detector. In various embodiments, PIC 104 includes a laser (not shown) optically coupled with region 154. In some embodiments, a laser external to PIC 104 may be optically coupled with region 154.

In various embodiments, an index matching material 156 is provided between optical port 128 and the substrate 102. More specifically, the index matching material 156 may be between the first sidewall 116 and second sidewall 120. The index matching material 156 may also be within optical port 128. Index matching material 156 may be an ultraviolet (UV) and/or thermal curable optical material with a refractive index matching that of the substrate. In various embodiments, index matching material 156 may be an ester, acrylic, or epoxy. In embodiments, index matching material 156 is applied in a way so as to prevent any air gaps between where the optical signal is output or detected and substrate 102.

As may be seen in FIGS. 1 and 2, PIC 104 includes a dielectric material 158 adjoining the plurality of electrically conductive contacts 152 of FLI or hardware interface 150. In embodiments, dielectric material 158 is patterned to expose one or more first fiducial markers 132 on third surface 134 of PIC 104.

Figure 3:
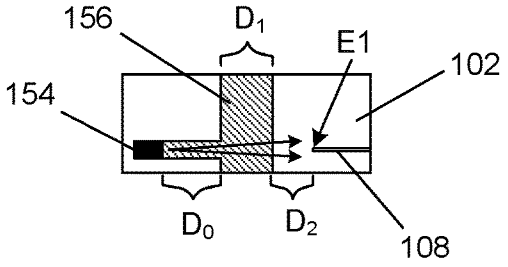
FIG. 3 is a portion of the view of the cross-sectional view of FIG. 2, enlarged for magnification purposes, according to an embodiment.

FIG. 3 is a portion of the view of the cross-sectional view of FIG. 2, enlarged for magnification purposes, according to an embodiment. As may be seen in FIG. 3, a distance between region 154 where an optical signal is output and an opening of the optical port 128 at second sidewall 120 is given by $D_0$. In an embodiment, $D_0 \leq 15$ μm. A distance between first sidewall 116 and second sidewall 120 is given by $D_1$. In an embodiment, $D_1 \leq 15$ μm. A distance between first sidewall 116 and first end E1 of optical waveguide 108, is given by $D_2$. In an embodiment, $D_2 \leq 5$ μm in order to keep the total distance less than about 35 μm to meet optical signal requirements.

Figure 4:
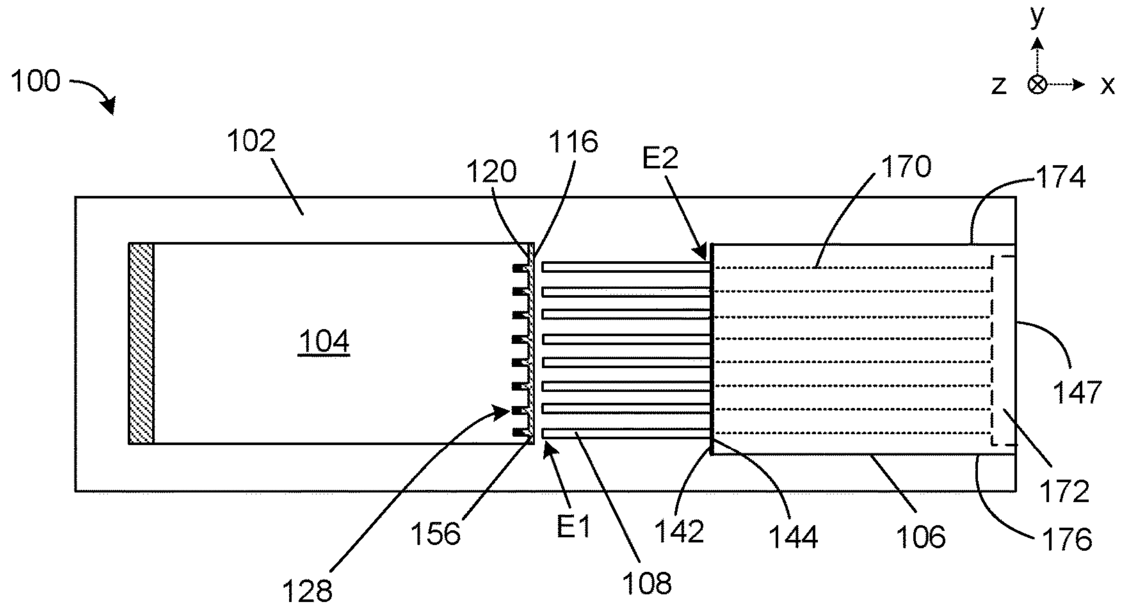
FIG. 4 is a cross-sectional top-down view of the optical interposer of FIG. 1 according to an embodiment.

FIG. 4 is a cross-sectional top-down view of optical interposer 100 of FIG. 1 according to an embodiment. The plane upon which FIG. 4 is taken is indicated in FIG. 1 by broken line 2-2 and the arrows intersecting the line are used as indications of the direction of sight. As can be seen in FIG. 4, optical interposer 100 comprises substrate 102, PIC 104, and FAU 106. Substrate 102 comprises at least on optical waveguide 108 and PIC 104 comprises at least one optical port 128. In the example shown in FIG. 4, substrate 102 comprises at eight optical waveguides 108 and PIC 104 comprises eight optical ports 128. In various embodiments, an index matching material 156 is provided between optical ports 128 and substrate 102, as well as within the optical ports. As noted above, first sidewall 116 of the hole 114 is proximate to the second sidewall 120.

FIG. 4, a first end E1 of each optical waveguide 108 is proximate to and aligned with one of the optical ports 128. In various embodiments, some of optical ports 128 may be used for transmitting signals while other of optical ports 128 may be used for receiving signals. For example, in an embodiment with eight optical ports 128, four ports may be configured for transmitting signals and four optical ports 128 may be configured for receiving signals. In an embodiment with 16 optical ports, eight may be configured for transmitting and eight configured for receiving, and so on. In various embodiments, a first optical port may be coupled with an optical source operable to transmit a signal, and a second optical port is coupled with an optical detector operable to a receive a signal. In some embodiments, a third sidewall 142 of recess 140 of substrate 102 comprises second ends E2 of optical waveguides 108. A fourth sidewall 144 of FAU 106 is proximate to or contacts the third sidewall 142 of substrate 102. FAU 106 comprises an outer sidewall 147, which is opposite to fourth sidewall 144. In some embodiments, a connector 172 is provided at outer sidewall 147. The connector 172 may include one or more optical sockets or one or more optical plugs in various embodiments. In some embodiments, the connector 172 is provided on any other surface of FAU 106 other than outer sidewall 147.

FAU 106 comprises interconnects 170 within the structure, shown with dotted lines. In embodiments, each interconnect 170 comprises a waveguide extending from a first optical interface to a second optical interface. In some embodiments, the first optical interface comprises a lens patterned in sidewall 142 of substrate 102 and proximate second end E2 of optical waveguide 108. In some embodiments, the second optical interface comprises a socket or plug in a connector 172. The first optical interface may be at the fourth sidewall 144 and proximate to the second end E2 of optical waveguide 108. While connector 172 may be at outer sidewall 147 in some embodiments, in other embodiments, connector 172 may be at bottom surface 146 or top surface 148. In still other embodiments, connector 172 may be at sidewall 174 or sidewall 176.

Figure 5:
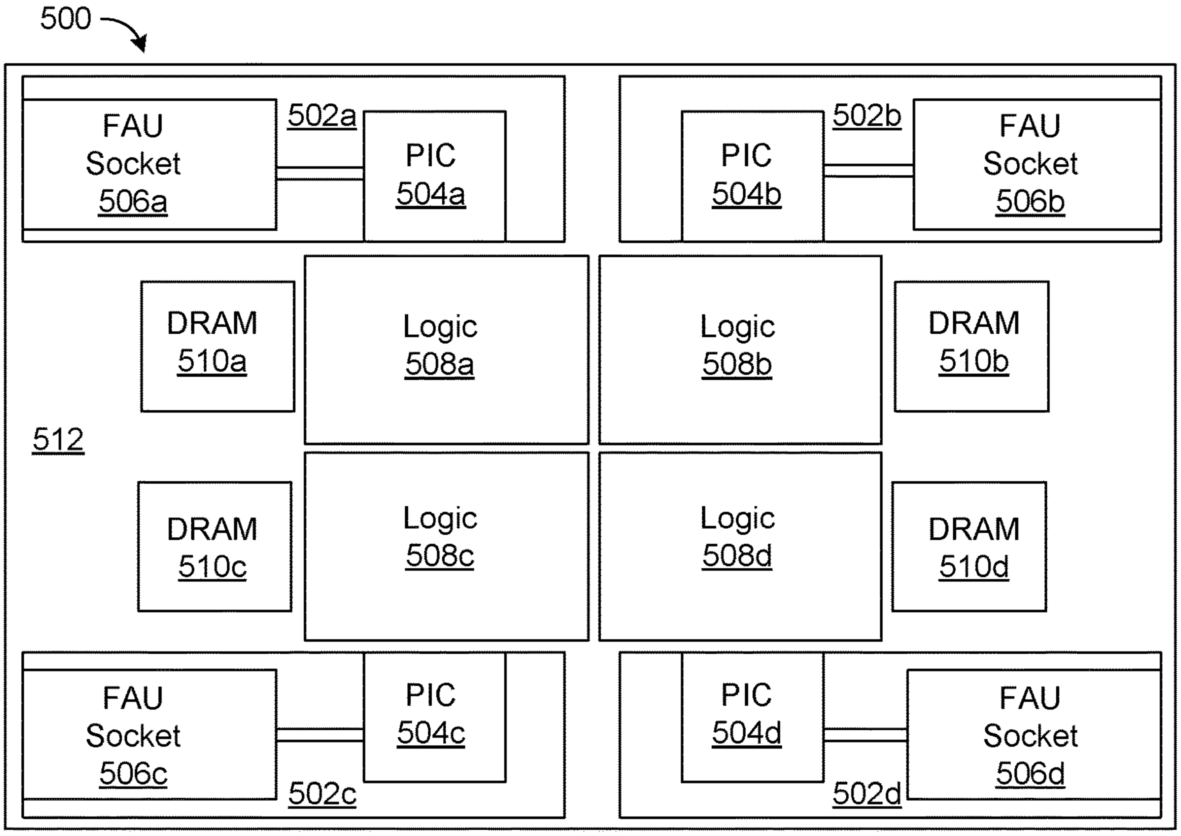
FIG. 5 is a plan view of an IC package comprising IC devices and optical interposers according to various embodiments.

FIG. 5 is a plan view of an IC package comprising IC devices and optical interposers according to various embodiments. IC package 500 includes optical interposers 502*a*, 502*b*, 502*c*, and 502*d*. Each optical interposer includes a respective one of PICs 504*a*, 504*b*, 504*c*, and 504*d*, and a respective one of FAU sockets 506*a*, 506*b*, 506*c*, and 506*d*. In embodiments, each of the optical interposers may be tested before being assembled into the IC package 500, so that only "known good" optical interposers are used in the manufacturing process. In addition, each of the optical interposers may be may be attached to a substrate or (PCB) 512 using a conventional method, such as solder interconnections or TCB. (Thermocompression bonding (TCB) refers to a process in which both temperature and pressure is applied to attach a top IC die to a bottom component.) In the shown example, IC package 500 includes one or more logic devices 508*a*, 508*b*, 508*c*, and 508*d*, and one or more dynamic random access memory (DRAM) devices 510*a*, 510*b*, 510*c*, and 510*d*. The logic devices may be processors, that is, any device or portion of a device that processes data from registers and/or memory to transform that data into other data that may be further stored in registers and/or memory. While the DRAM devices are included in the example IC package 500, any desired type of memory may be included in the IC package, such as volatile memory (e.g., DRAM), non-volatile memory (e.g., ROM), flash memory (e.g., NAND or NOR memory), or magnetic memory (MRAM). It should be appreciated that IC package 500 may include any additional or different devices or component that may be desired, such as a graphics processor, a digital signal processor, a crypto processor, a chipset, a transmitter, a receiver, an antenna, a display controller, a battery, an audio codec, a video codec, a power amplifier, a global positioning system (GPS) device, a compass, an accelerometer, a gyroscope, a speaker, a camera, or a mass storage device (such as hard disk drive, solid-state drive (SSD), compact disk (CD), digital versatile disk (DVD).

In some embodiments, IC package 500 may be, or may be included in, a personal or server computer. In some embodiments, IC package 500 may be, or may be included in, a mobile computing platform or portable computing device configured for each of electronic data display, electronic data processing, wireless electronic data transmission, or the like. For example, IC package 500 may be, or may be included in, a tablet, a smart phone, or laptop computer, and may include a display screen, a chip-level or package-level integrated system, and a battery.

Figure 6:
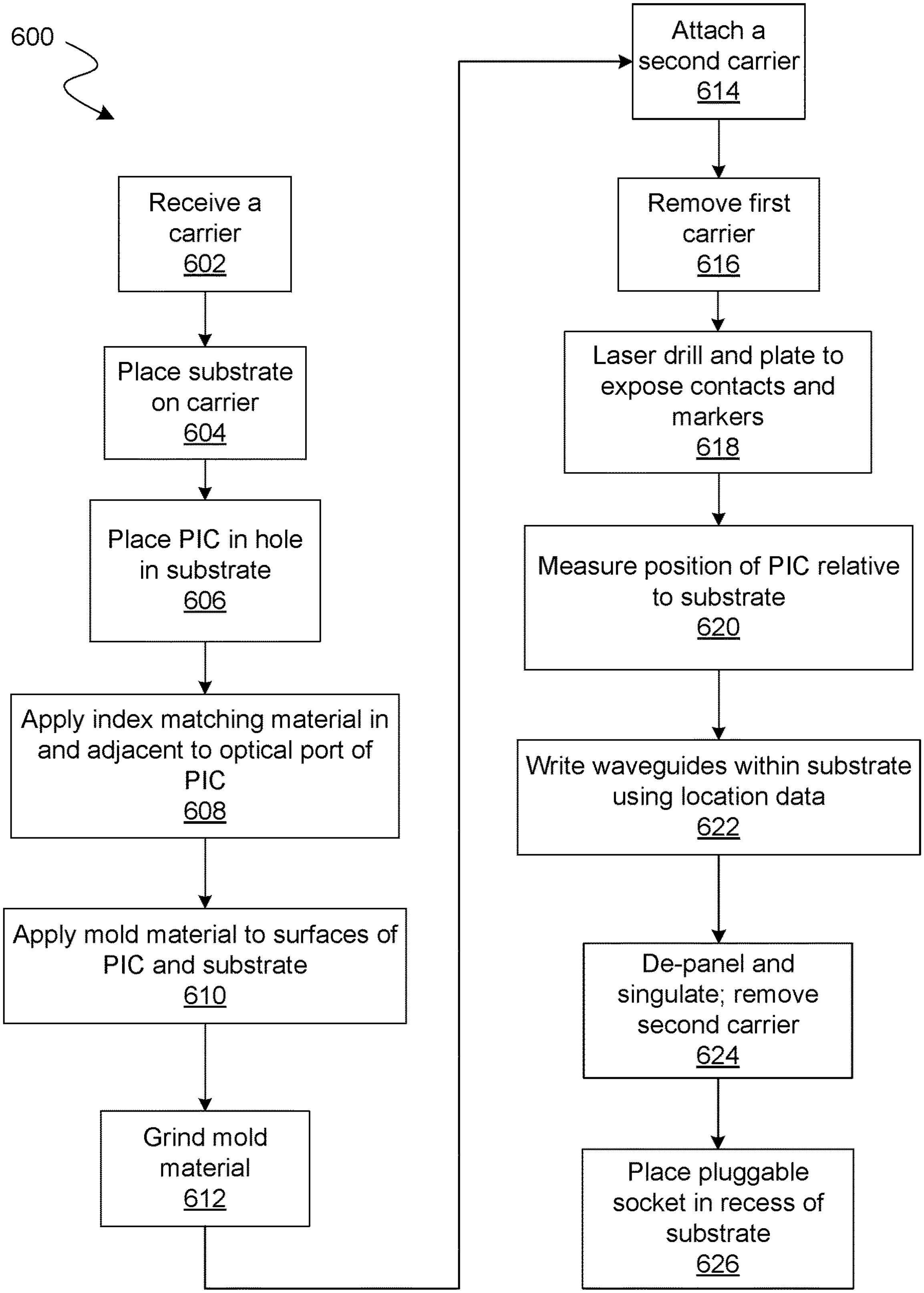
FIG. 6 is a flow diagram illustrating methods of forming an optical interposer at various of steps manufacture according to some embodiments.

FIG. 6 is a flow diagram illustrating methods for assembling an optical interposer at various of steps manufacture according to some embodiments. Although the blocks in the flowchart with reference to FIG. 6 are shown in a particular order, the order of the actions can be modified. Thus, the illustrated embodiments can be performed in a different order, and some actions/blocks may be performed in parallel. Some of the blocks and/or operations listed in FIG. 6 are optional in accordance with certain embodiments. The numbering of the blocks presented is for the sake of clarity and is not intended to prescribe an order of operations in which the various blocks must occur. Additionally, operations from the various flows may be utilized in a variety of combinations.

Figure 7:
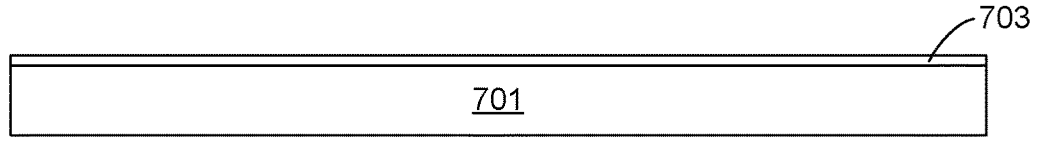
FIGS. 7, 8, 9, 10, 11, 12, 13, 14, 15, 16, 17, 18, and 19 illustrate an optical interposer at various of steps manufacture according to some embodiments.

Methods 600 may begin with receiving a carrier at operation 602. FIG. 7 is a cross-sectional illustration of carrier 701 that may be received as a starting material at 602. The carrier 701 may be a glass carrier and may include a bonding film 703 on a surface. Although a carrier for only one optical interposer is illustrated in FIG. 7, it should be appreciated that carrier 701 may be one portion of a large wafer-sized carrier from which multiple optical interposers may be fabricated. As described below, various structures are formed on carrier 701, after which carrier 701 is discarded. Carrier 701 may have a thickness sufficient to provide the strength needed at various stages of the manufacturing process.

Figure 8:
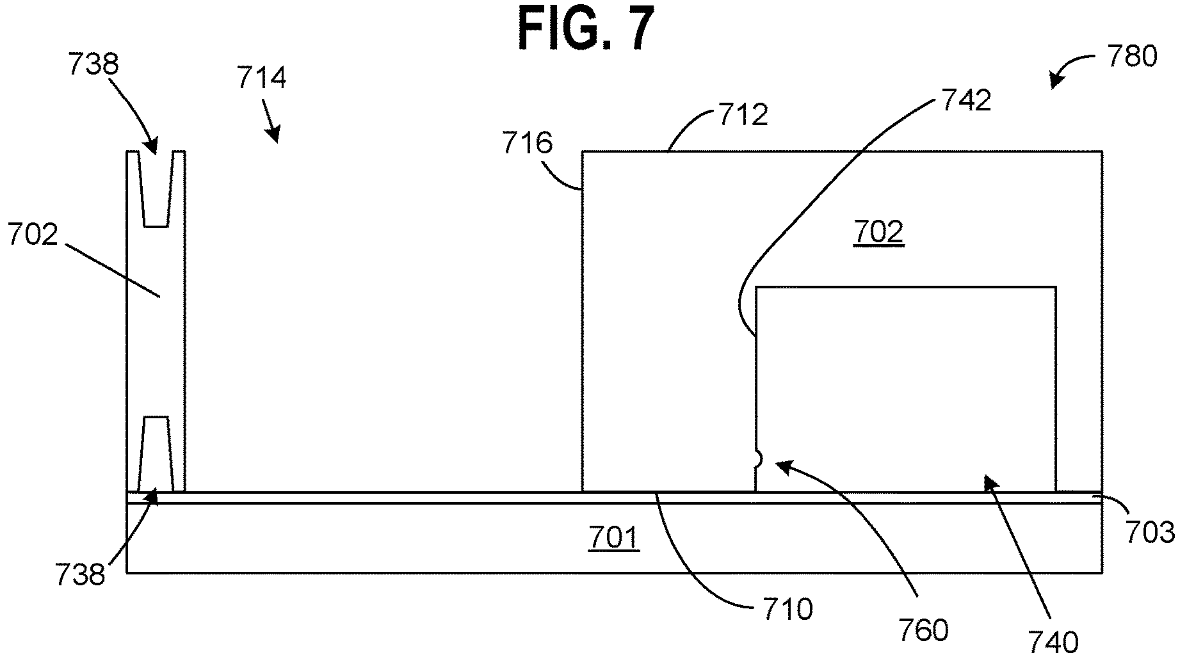

At 604, a substrate is placed on the carrier. FIG. 8 is a cross-sectional illustration of an assembly 780 comprising a carrier 701 after a patterned glass substrate 702 has been placed on it. The patterned glass substrate 702 has a first surface 710 and a second surface 712, which is opposite the first surface. In embodiments, patterned glass substrate 702 includes a hole 714 extending from the first surface to the second surface and a recess 740 to receive a device, e.g., a fiber array unit having a socket. In some embodiments, substrate 702 includes a lens 760 patterned in a sidewall 742 of recess 740. In various embodiments, substrate 702 includes one or more fiducial markers 738 on surfaces 710, 712. It should be noted that there are no optical waveguides written in patterned glass substrate 702 at the stage of manufacturing shown in FIG. 8, e.g., operation 604.

Figure 9:
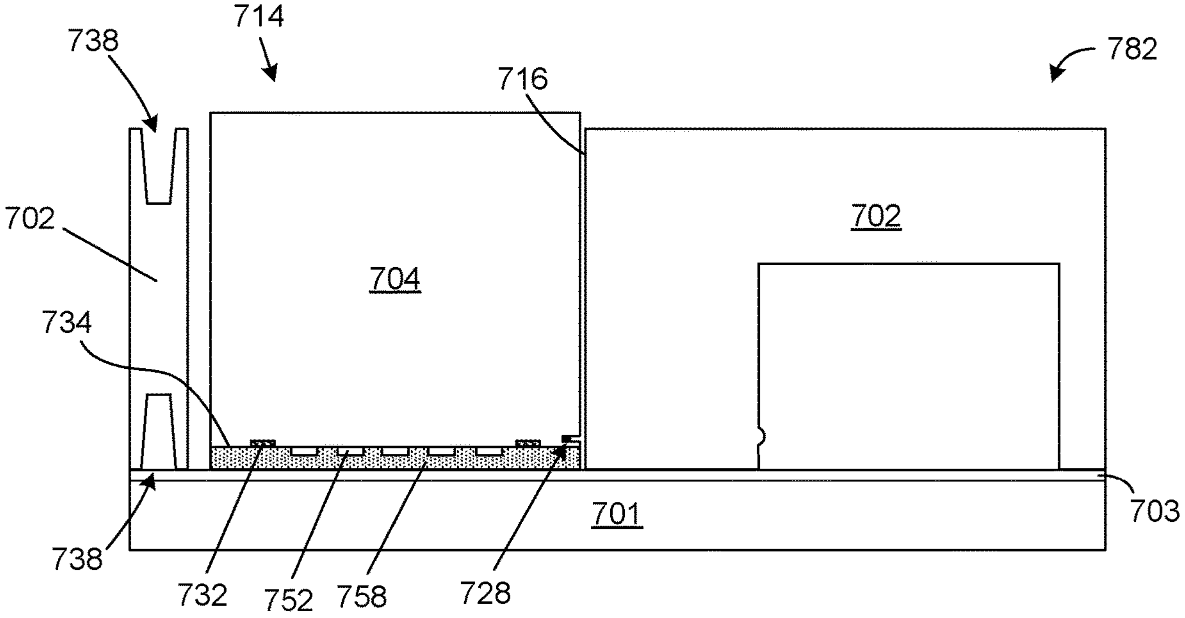

At 606, a photonic IC is placed within a hole in the substrate. Operation 606 also includes aligning the PIC with a fiducial marker and an edge of the hole. FIG. 9 is a cross-sectional illustration of an assembly 782 comprising carrier 701 and substrate 702 after a PIC 704 is placed hole 714, and aligned with a first sidewall 716 of hole 714, and a fiducial marker 738. As may be seen in FIG. 9, PIC 104 includes a dielectric material 758 adjoining a plurality of electrically conductive contacts 752, and at least one first fiducial marker 732 at third surface 734. In addition, PIC 104 includes at least one optical port 728.

Figure 10:
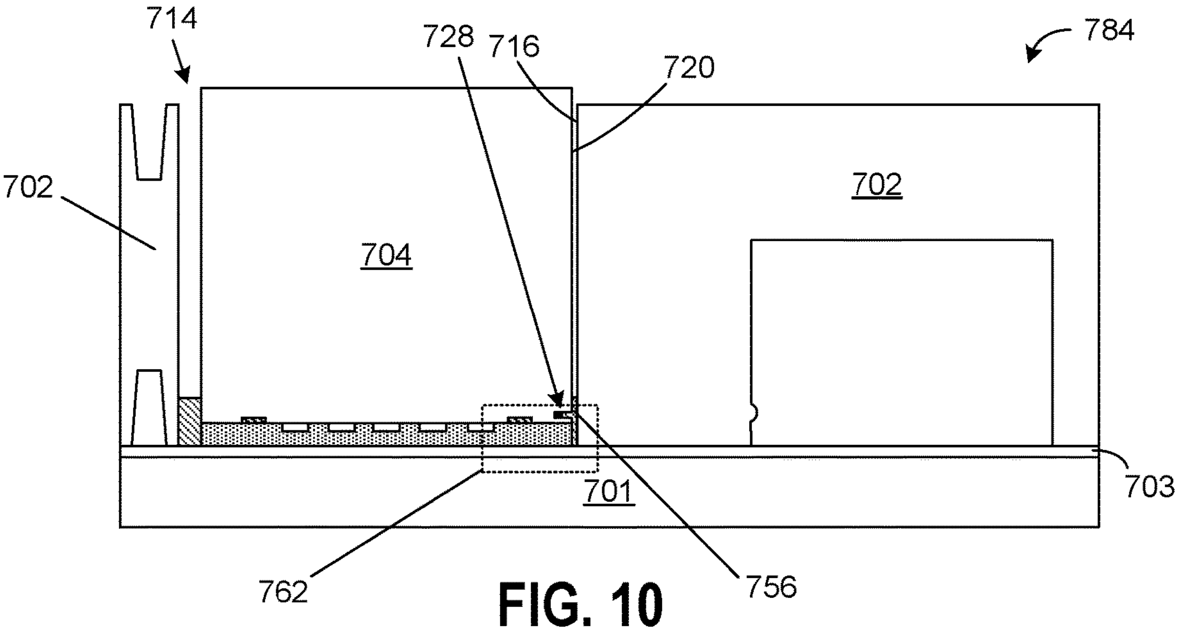
Figure 11:
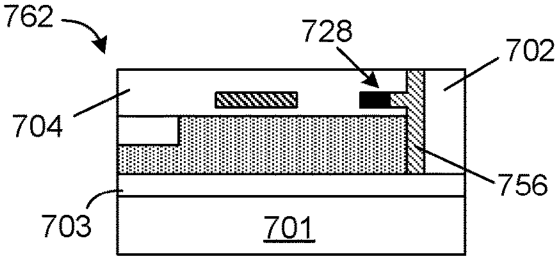

At 608, an index matching material is applied between an optical I/O of the photonic IC and the substrate. Operation 608 may include curing the index matching material. FIG. 10 is a cross-sectional illustrate of an assembly 784 comprising assembly 782 after index matching material 756 is applied between optical port 728 of PIC 704 and the substrate 702, and within optical port 728. The matching material 756 is between first sidewall 716 of hole 714 and second sidewall 720 of PIC 104. FIG. 11 is a portion 762 of the view of the cross-sectional view of FIG. 10, enlarged for magnification purposes.

Figure 12:
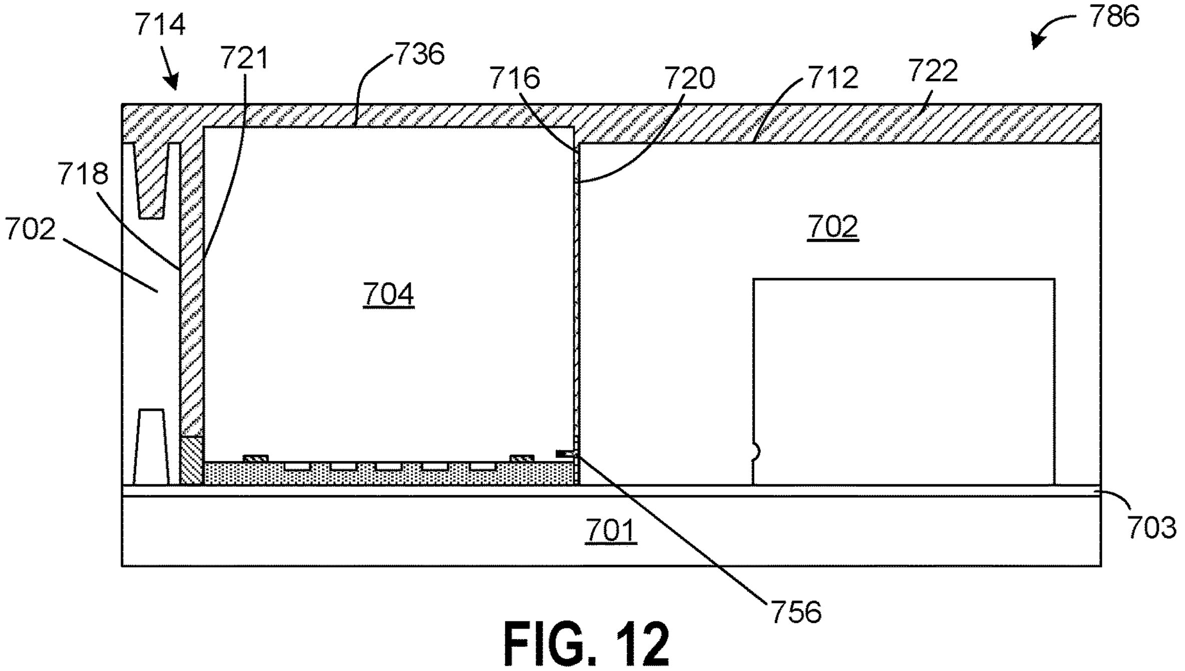

At 610, a mold material is applied to surfaces of the photonic IC and the substrate. FIG. 12 is a cross-sectional illustration of an assembly 786 comprising assembly 784 after application of a mold material 722. As can be seen from FIG. 12, mold material 720 fills the space between the first sidewall 716 and second sidewall 721, and the space between sidewall 718 of hole 714 and sidewall 722 of PIC 704. In addition, mold material 722 is on the second surface 712 of substrate 702, and a fourth surface 736 of PIC 704.

Figure 13:
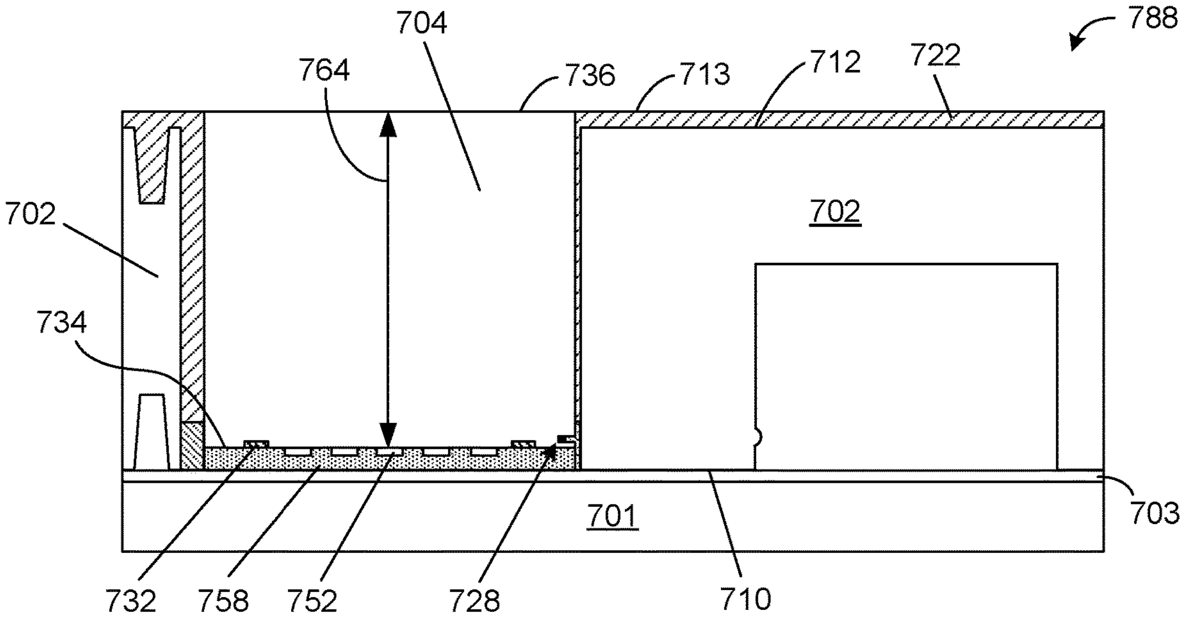

At 612, a grinding operation is performed on the mold material. FIG. 13 is a cross-sectional illustration of an assembly 788, which comprises the assembly 786 after a grinding operation has been performed on mold material 722. The grinding operation exposes fourth surface 736 of PIC 704, which is opposite the third surface 734. Because of silicon's good thermal conductivity, exposing fourth surface 736 provides a thermal path, indicated generally by arrow 764, which advantageously allows heat to reach solder interconnects at surface 734 during a subsequent assembly operation. It should be noted that if mold material were to be present at fourth surface 736, it would undesirably degrade thermal path 764 and, in embodiments, substantially all mold material 722 is removed from the surface 736. An exterior surface of the mold material 722 is designated with reference number 713. Exterior surface 713 is opposite to the surface of the mold material 722 that contacts second surface 712 of substrate 702. In embodiments, fourth surface 736 of PIC 704 and exterior surface 713 of mold material 722 are in the same plane, and are both substantially flat or level. Operation 612 may optionally include a polishing process. In embodiments, mold material 722 may be a dielectric material. In embodiments, exterior surface 713 of mold material 722 may comprise an artifact of a grinding process or a polishing process. In various embodiments, PIC 704 comprises a thermally conductive layer, e.g., silicon, and the fourth surface 736 is an outside surface of an optical interposer or other device.

Figure 14:
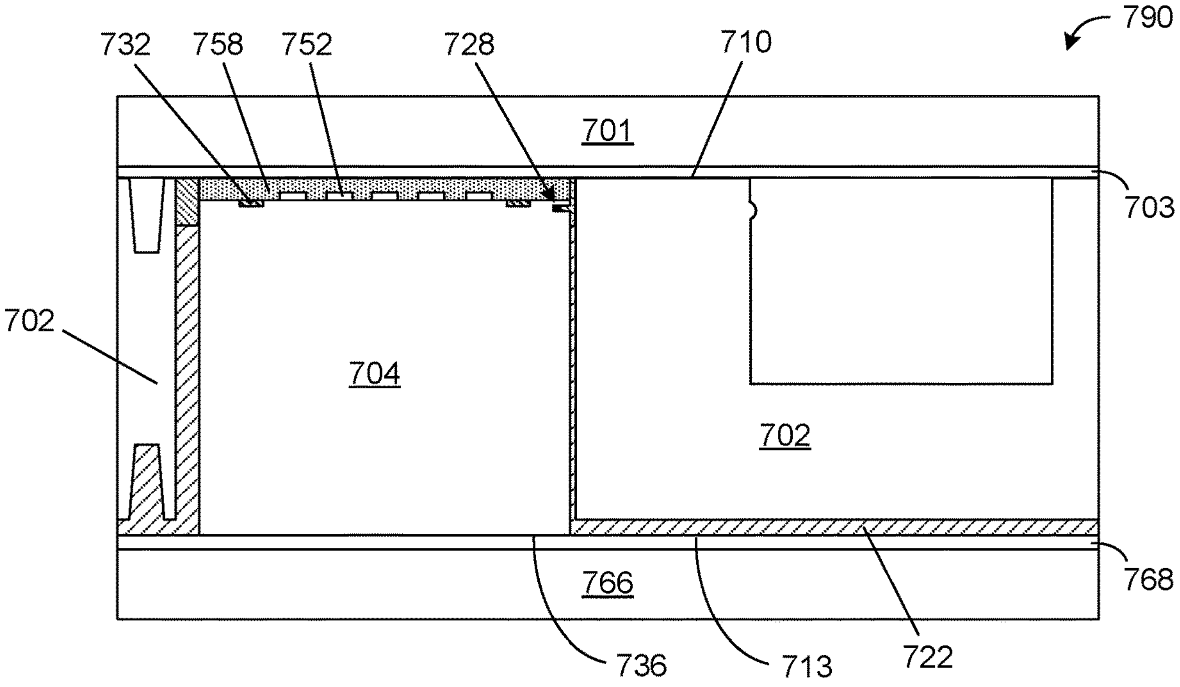

Various manufacturing operations require access to a side of the assembly opposite to fourth surface 736 of PIC 704 and exterior surface 713 of mold material 722. This opposite side of the assembly is adjacent to carrier 701 and bonding film 703 and is at the bottom in FIG. 13. At 614, a second carrier is attached and the assembly is inverted to provide access to this side. FIG. 14 is a cross-sectional illustration of an assembly 790, which comprises the assembly 788 after inverting the assembly 788, and attaching a second carrier 766. Operation 614 comprises attaching second carrier 766 and, optionally, applying a bonding film 768 between second carrier 766 and fourth surface 736 and exterior surface 713 of mold material 722. The second carrier 766 may be similar to or the same as carrier 701.

Figure 15:
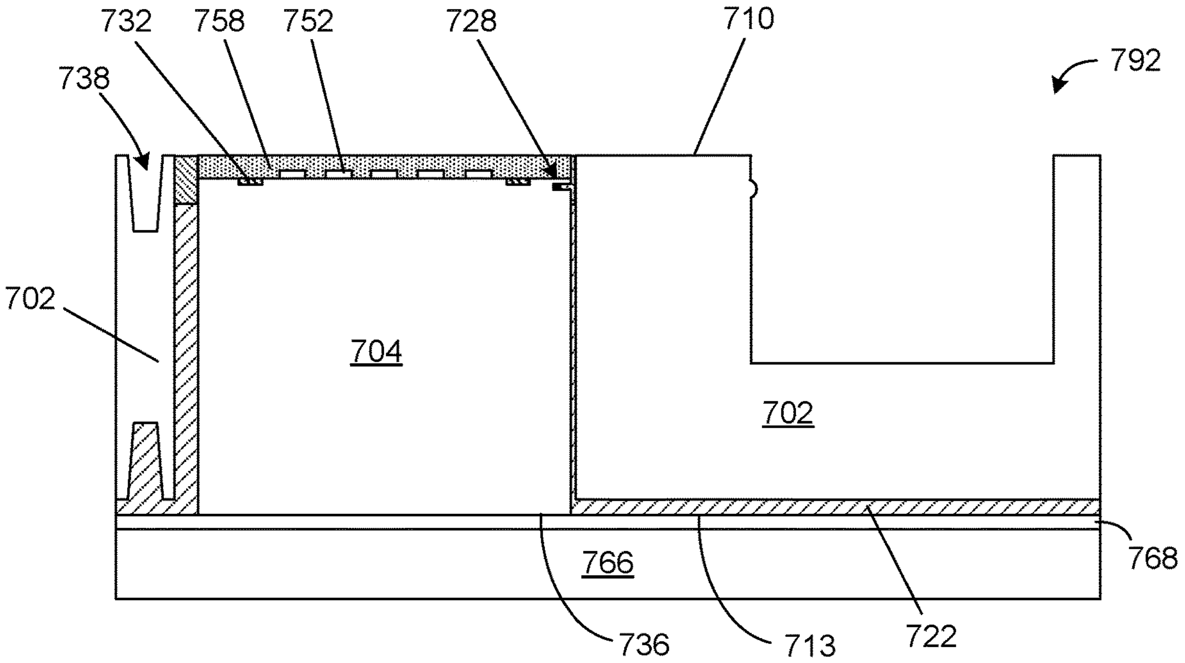

At 616, the first carrier 701 and bonding film 703 are removed. FIG. 15 is a cross-sectional illustration of an assembly 792, which comprises the assembly 790 after the first carrier 701 and bonding film 703 have been removed.

Figure 16:
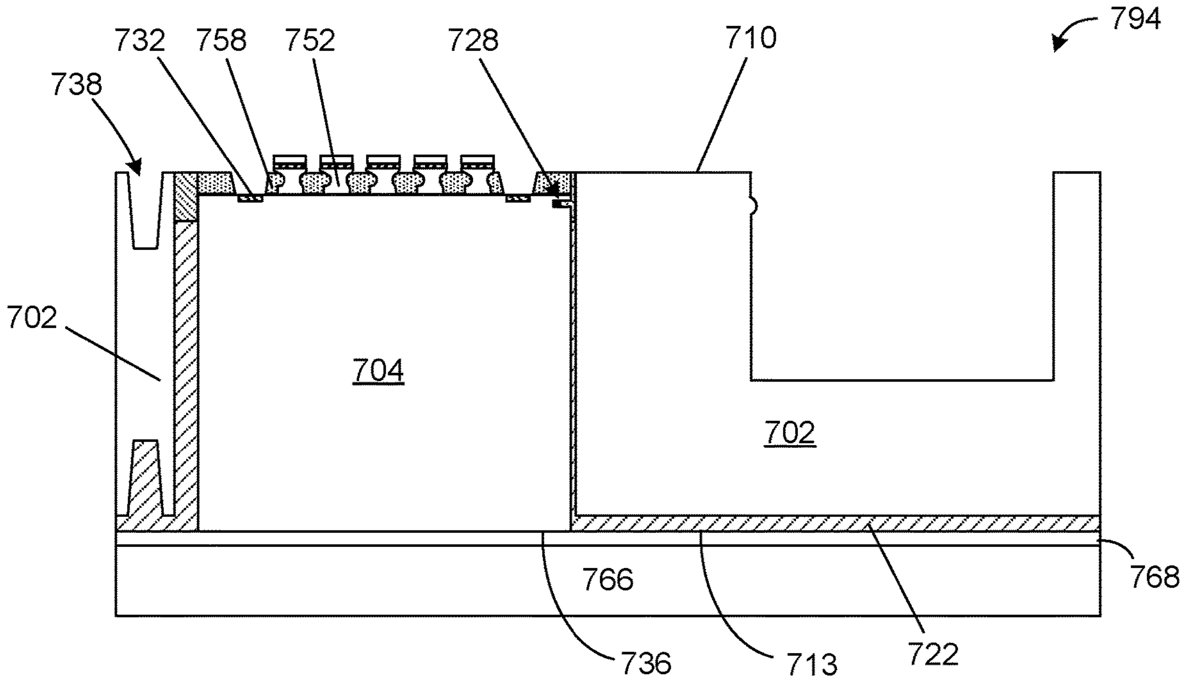

At 618, dielectric 758 of PIC 704 may be laser drilled to expose conductive contacts 752 and fiducial markers 732. In addition, conductive contacts 752 may be plated to form what will become first level interconnects (FLI) or hardware interface 150. FIG. 16 is a cross-sectional illustration an assembly 794, which comprises the assembly 792 after a laser drilling and plating operations.

Figure 17:
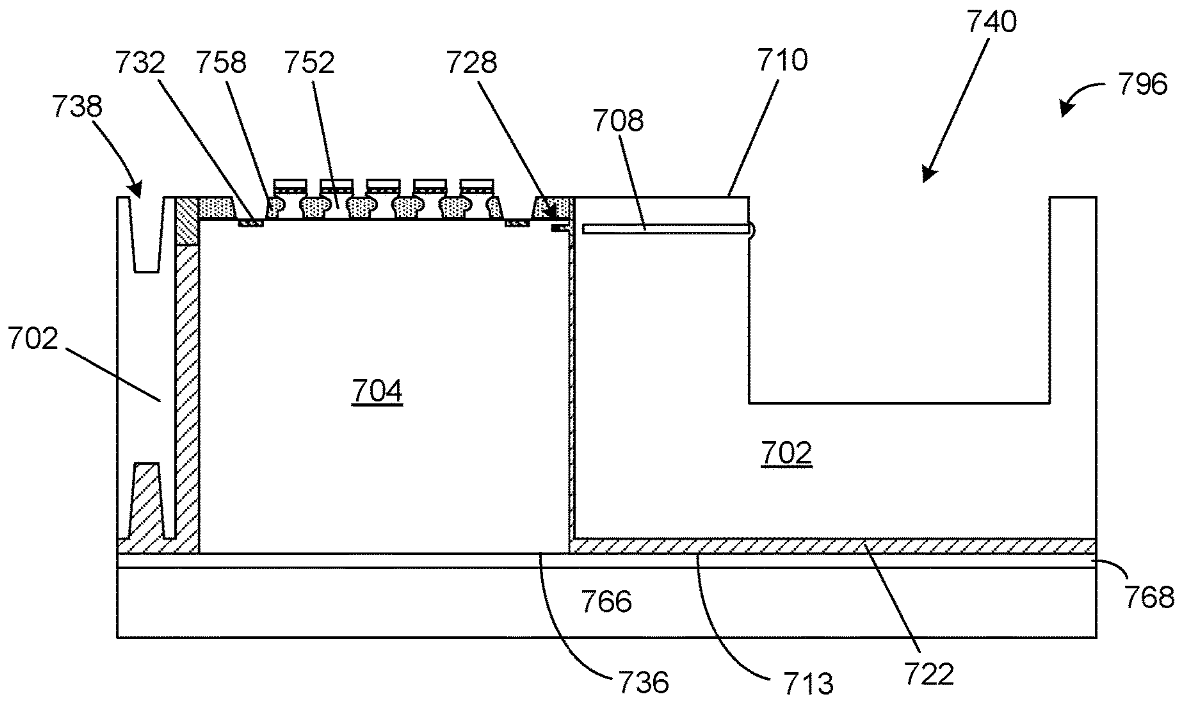

At 620, the relative position of PIC 704 to substrate 702 is measured using first fiducial markers 732 and second fiducial markers 738, which results in location data. At 622, the location data is received by a laser tool and the laser tool uses the location data to write one or more waveguides 708 in substrate 702. FIG. 17 is a cross-sectional illustration of the assembly an assembly 796, which comprises an assembly 794 after one or more waveguides 708 have been written with a laser tool using the location data obtained at operation 620. Advantageously, using a laser tool to write waveguides 708, after the PIC 704 and substrate 702 are in fixed relation to one another, produces waveguides that have good alignment between optical port 728 and waveguide 708. An additional advantage is that the waveguides may be written in an automated fashion without the need for the time-consuming testing-and-position-adjusting process needed when optical fiber is placed in a v-groove as described above. In an embodiment, a centerline of optical waveguide 708 is laterally aligned with a centerline of the optical port 728 within approximately +/−1.5 μm, and a centerline of the optical waveguide 708 is vertically aligned with the centerline of the optical port 728 within approximately +/−1.5 μm, wherein a cross-sectional diameter of a waveguide is approximately 10 μm.

Figure 18:
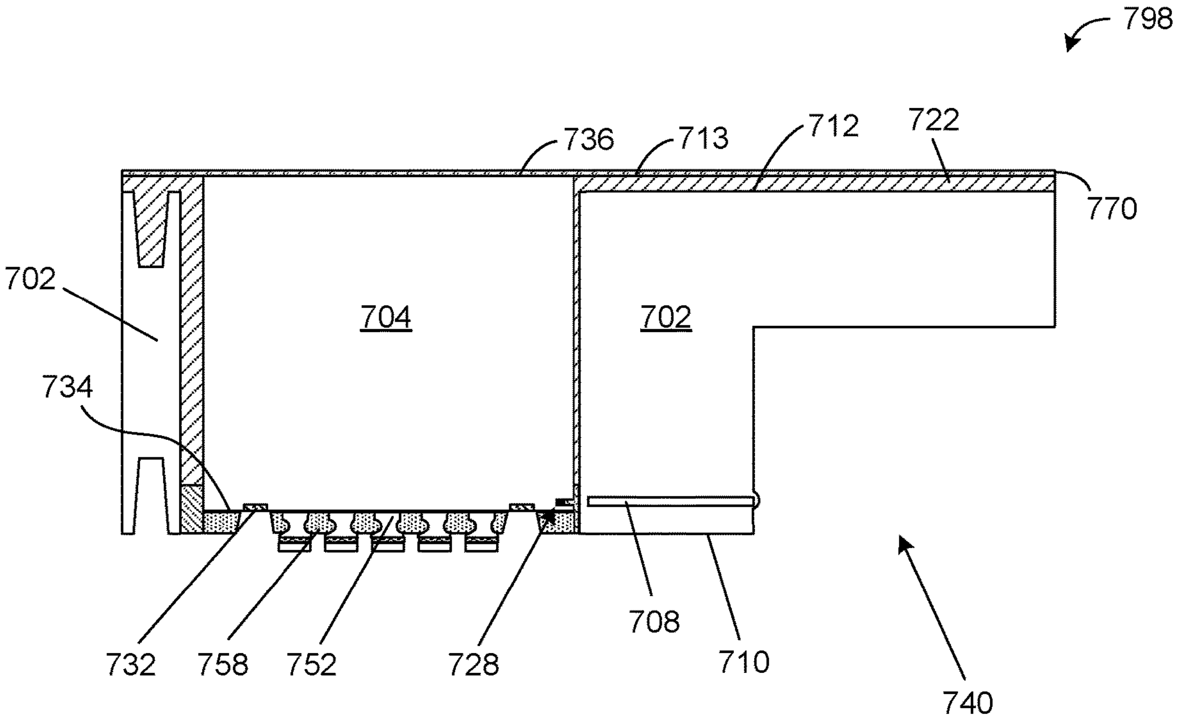

At 624, the assembly may be de-paneled and singulated, and the second carrier removed. In addition, an optional backside metallization layer may be applied, if needed. In some embodiments, the assembly may also be tested at 624. At 624, the assembly may be inverted. FIG. 18 is a cross-sectional illustration of an assembly 798, which comprises the assembly 796 after second carrier 766 and bonding film 768 have been removed, an optional backside metallization layer 726 has been added, and after the assembly has been singulated. The view of assembly 798 in FIG. 18 is inverted from the view of assembly 796 in FIG. 17. In some embodiments, mold material 722 is between the substrate 702 and the back-side metallization layer 726.

Figure 19:
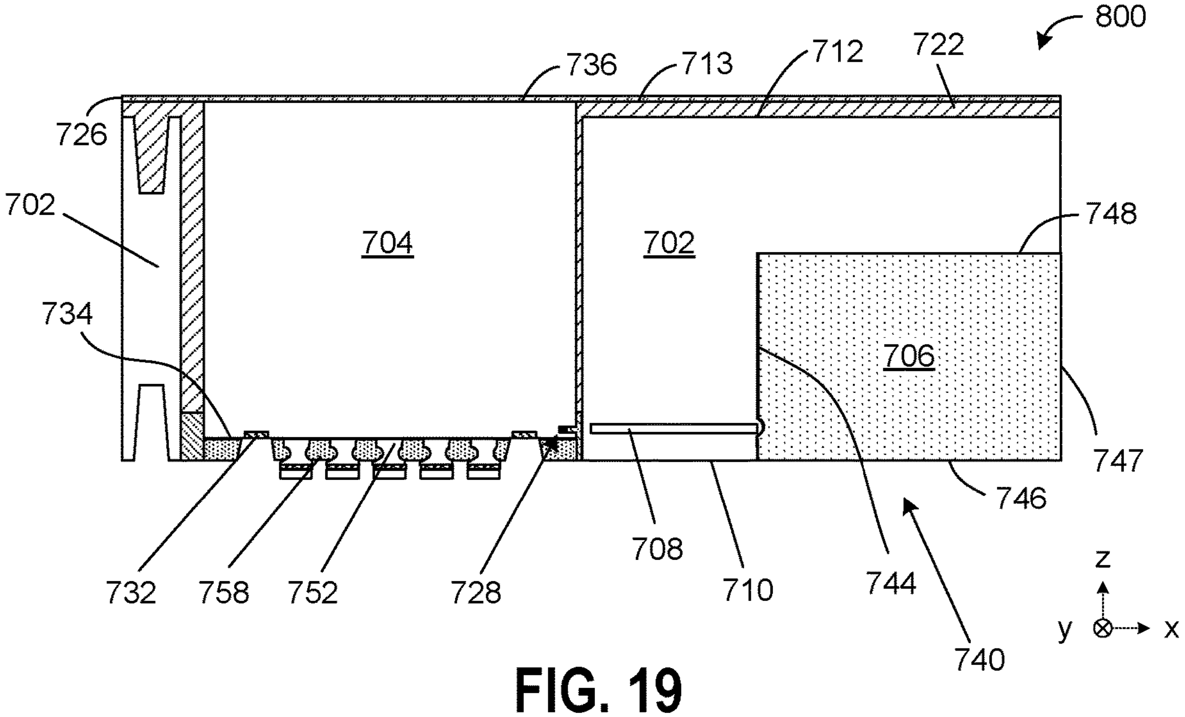

At 626, FAU 706 or other suitable device may be placed in recess of substrate 702. In addition, in some embodiments, the assembly may be tested at 626. FIG. 19 is a cross-sectional illustration of an assembly 800 comprising the assembly 798 after FAU 706 or other suitable device having a socket or a plug has been placed in recess 740.

Figure 20:
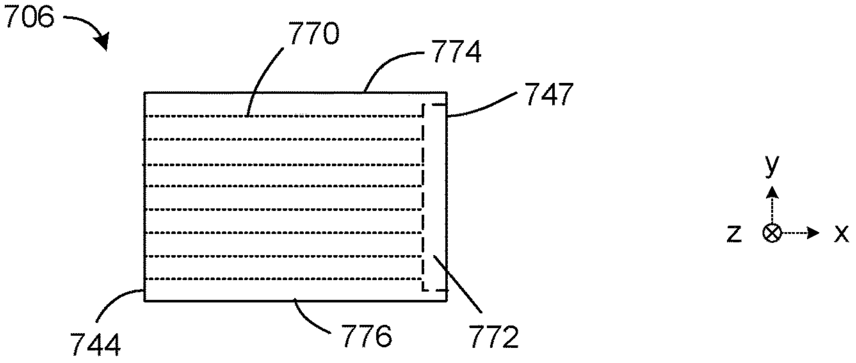
FIG. 20 is a top-down view of a FAU according to various embodiments.

FIG. 20 is a top-down view of FAU 706 according to various embodiments. FAU 706 comprises interconnects 770 within the structure, shown with dotted lines. In embodiments, each interconnect 770 comprises an optical waveguide extending from a first optical interface to a second optical interface. The first optical interface may be proximate a first end of an interconnect 770, e.g., the first optical interface may be at fourth sidewall 744. The second optical interface may be proximate a second end of an interconnect 770, wherein the second end is opposite the first end, e.g., the second optical interface may be at connector 772. The connector 772 (shown with dotted lines) may be at outer sidewall 747. While connector 772 may be at outer sidewall 747 in some embodiments, in other embodiments, connector 772 may be at bottom surface 746 or top surface 748. In still other embodiments, connector 772 may be at sidewall 774 or sidewall 776. The connector 772 may include either optical sockets or receptacles to receive optical pins or plugs, optical pins or plugs for insertion into optical sockets or receptacles, or both optical sockets or receptacles and optical pins or plugs.

Figure 21:
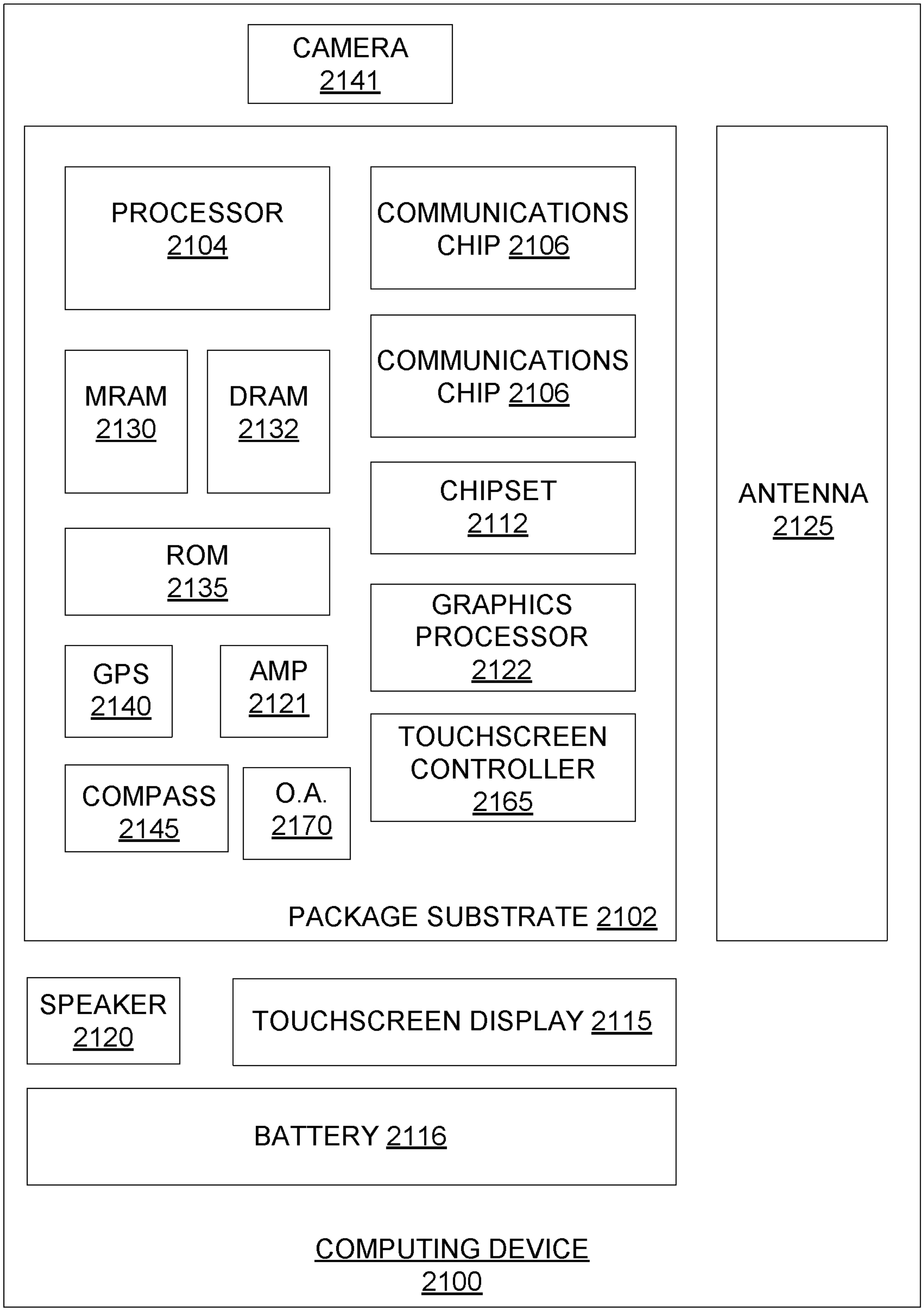
FIG. 21 is a functional block diagram of an electronic computing device including an optical interposer in accordance with various embodiments.

FIG. 21 is a functional block diagram of an electronic computing device 2100, in accordance with an embodiment. Device 2100 further includes a package substrate 2102 hosting a number of components, such as, but not limited to, a processor 2104 (e.g., an applications processor). In embodiments, device 2100 includes an optical interposer 2170 comprising a PIC and an FAU socket as described elsewhere herein. Processor 2104 may be physically and/or electrically coupled to package substrate 2102. In some examples, processor 2104 is within a composite IC chip structure including a chiplet bonded to a host IC chip, for example as described elsewhere herein. Processor 2104 may be implemented with circuitry in either or both of the host IC chip and chiplet. In general, the term "processor" or "microprocessor" may refer to any device or portion of a device that processes electronic data from registers and/or memory to transform that electronic data into other electronic data that may be further stored in registers and/or memory.

In various examples, one or more communication chips 2106 may also be physically and/or electrically coupled to the package substrate 2102. In further implementations, communication chips 2106 may be part of processor 2104. Depending on its applications, computing device 2100 may include other components that may or may not be physically and electrically coupled to package substrate 2102. These other components include, but are not limited to, volatile memory (e.g., DRAM 2132), non-volatile memory (e.g., ROM 2135), flash memory (e.g., NAND or NOR), magnetic memory (MRAM 2130), a graphics processor 2122, a digital signal processor, a crypto processor, a chipset 2112, an antenna 2125, touchscreen display 2115, touchscreen controller 2165, battery 2116, audio codec, video codec, power amplifier 2121, global positioning system (GPS) device 2140, compass 2145, accelerometer, gyroscope, speaker 2120, camera 2141, and mass storage device (such as hard disk drive, solid-state drive (SSD), compact disk (CD), digital versatile disk (DVD), and so forth), or the like. In some exemplary embodiments, at two of the functional blocks noted above are within a composite IC chip structure including a chiplet bonded to a host IC chip, for example as described elsewhere herein. For example, processor 2104 be implemented with circuitry in a first of the host IC chip and chiplet, and an electronic memory (e.g., MRAM 2130 or DRAM 2132) may be implemented with circuitry in a second of the host IC chip and chiplet.

Communication chips 2106 may enable wireless communications for the transfer of data to and from the computing device 2100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. Communication chips 2106 may implement any of a number of wireless standards or protocols. As discussed, computing device 2100 may include a plurality of communication chips 2106. For example, a first communication chip may be dedicated to shorter-range wireless communications, such as Wi-Fi and Bluetooth, and a second communication chip may be dedicated to longer-range wireless communications such as GPS, EDGE, GPRS, CDMA, WiMAX, LTE, Ev-DO, and others.

Figure 22:
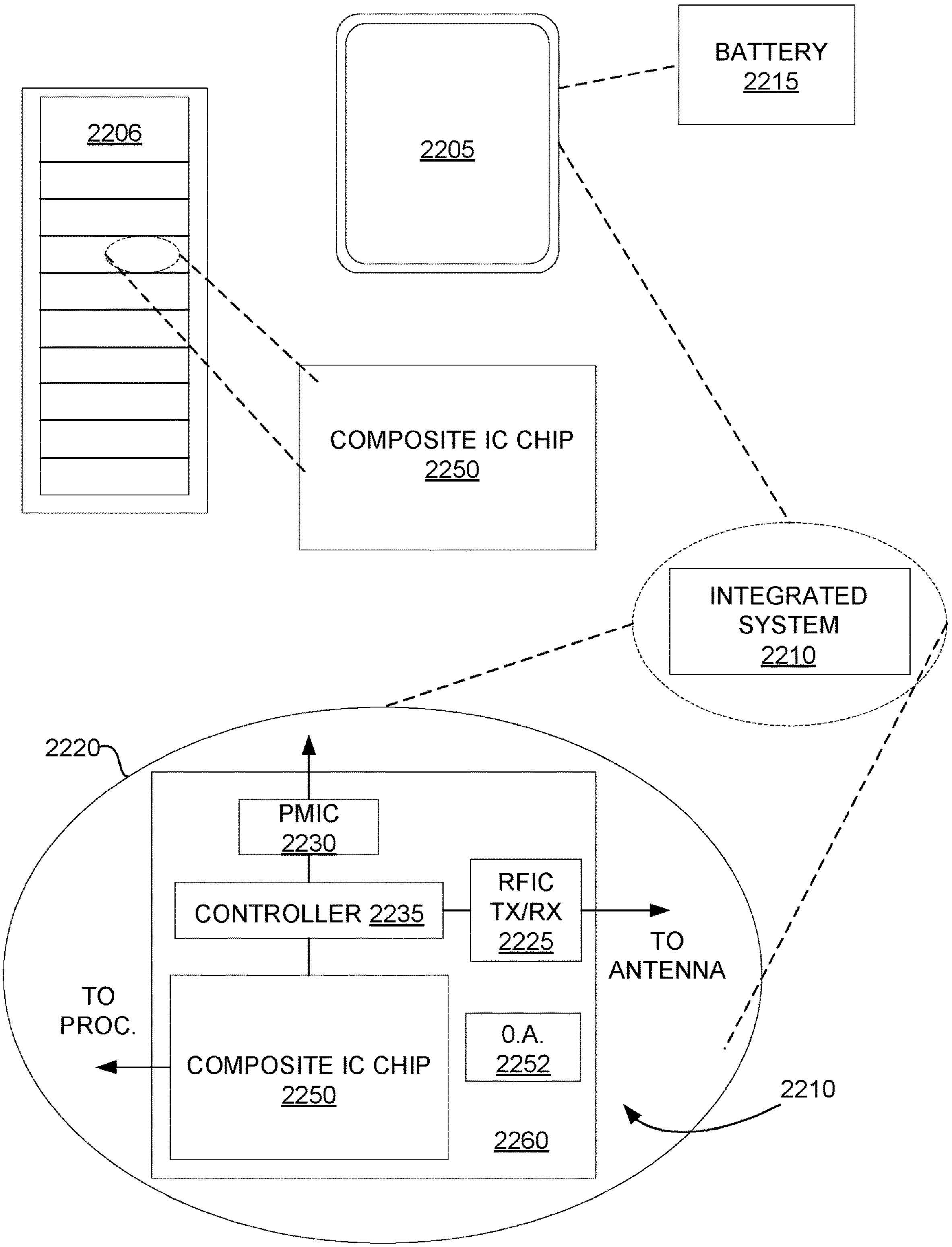
FIG. 22 illustrates a mobile computing platform and a data server machine employing an optical interposer in accordance with various embodiments.

FIG. 22 illustrates a mobile computing platform and a data server machine employing an IC device comprising at least one PIC included in an optical interposer as described elsewhere herein, for example as described elsewhere herein. Computing device 2100 may be found inside platform 2205 or server machine 2206, for example. The server machine 2206 may be any commercial server, for example including any number of high-performance computing platforms disposed within a rack and networked together for electronic data processing, which in the exemplary embodiment includes at least one PIC included in an optical interposer, for example as described elsewhere herein. The mobile computing platform 2205 may be any portable device configured for each of electronic data display, electronic data processing, wireless electronic data transmission, or the like. For example, the mobile computing platform 2205 may be any of a tablet, a smart phone, laptop computer, etc., and may include a display screen (e.g., a capacitive, inductive, resistive, or optical touchscreen), a chip-level or package-level integrated system 2210, and a battery 2215.

Whether disposed within the integrated system 2210 illustrated in the expanded view 2220, or as a stand-alone package within the server machine 2206, composite IC chip 2250 may include a chiplet bonded to a host IC chip, for example as described elsewhere herein. Composite IC chip 2250 may be further coupled to a host substrate 2260, along with an optical interposer 2252 comprising a PIC and an FAU socket as described elsewhere herein, one or more of a power management integrated circuit (PMIC) 2230, RF (wireless) integrated circuit (RFIC) 2225 including a wide-band RF (wireless) transmitter and/or receiver (TX/RX) (e.g., including a digital baseband and an analog front end module further comprises a power amplifier on a transmit path and a low noise amplifier on a receive path), and a controller 2235. PMIC 2230 may perform battery power regulation, DC-to-DC conversion, etc., and so has an input coupled to battery 2215 and with an output providing a current supply to other functional modules. As further illustrated, in the exemplary embodiment, RFIC 2225 has an output coupled to an antenna (not shown) to implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 4G, and beyond.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the invention is not limited to the embodiments so described, but can be practiced with modification and alteration without departing from the scope of the appended claims. For example, the above embodiments may include specific combinations of features as further provided below.

In a first example, a device comprises: a substrate comprising: a first surface; a second surface opposite the first surface; an optical waveguide integral within the substrate; and a hole extending from the first surface to the second surface, the hole comprising a first sidewall, wherein the optical waveguide is between the first surface and the second surface, parallel to the first surface, and comprises a first end at the first sidewall; and an integrated circuit (IC) die within the hole, the IC die comprising: a second sidewall; and an optical port at the second sidewall, wherein the second sidewall is proximate to the first sidewall, and the first end of the optical waveguide is proximate to and aligned with the optical port.

In a second example, the device of example 1, wherein the IC die further comprises: a first fiducial marker; a third surface; and a fourth surface opposite the third surface; wherein the second sidewall is orthogonal to the third surface, and the first fiducial marker is at the third surface.

In a third example, the device of examples 1 or 2, wherein the substrate further comprises a second fiducial marker at the first surface or the second surface.

In a fourth example, the device of any one of examples 1 to 3, wherein the substrate further comprises a recess at the first surface to receive another device, the recess comprising a third sidewall, wherein the third sidewall comprises a second end of the optical waveguide.

In a fifth example, the device any one of examples 1 to 4, wherein the device further comprises: the other device, wherein the other device is within the recess and comprises: a fourth sidewall proximate to the third sidewall; a third surface; a first optical interface; a second optical interface; and an interconnect coupling the first optical interface with the second optical interface, wherein the first optical interface is at the fourth sidewall and proximate to the second end of the optical waveguide, and the second optical interface is at the third surface.

In a sixth example, the device of example 5, wherein the second optical interface comprises: a socket to receive an optical plug; or an optical plug for insertion into a socket.

In a seventh example, the device any one of examples 1 to 6, wherein the IC die further comprises: a third surface; a fourth surface opposite the third surface, wherein the second sidewall is orthogonal to the third surface; and a hardware interface comprising a plurality of electrically conductive contacts at the third surface.

In an eighth example, the device of example 7, wherein the IC die further comprises a dielectric material adjoins the plurality of electrically conductive contacts, and wherein the dielectric material is patterned to expose a first fiducial marker on the third surface of the IC die.

In a ninth example, the device of any one of examples 1 to 7, wherein the IC die further comprises a thermally conductive layer, and wherein the fourth surface is an outside surface of the device.

In a tenth example, the device of any one of examples 1 to 7, or 9, further comprising a mold material between the IC die and the substrate.

In an eleventh example, the device of any one of examples 1 to 7 or 9 to 10, further comprising a dielectric material layer contacting the second surface of the substrate, wherein the dielectric material layer comprises an artifact of a grinding process or a polishing process.

In a twelfth example, the device of any one of examples 1 to 7 or 9 to 11, wherein the substrate comprises a patterned glass.

In a thirteenth example, the device of any one of examples 1 to 7 or 9 to 12, further comprising an index matching material between the optical port and the substrate.

In a fourteenth example, the device of any one of examples 1 to 7 or 9 to 13, wherein the IC die further comprises a laser.

In a fifteenth example, the device of any one of examples 1 to 7 or 9 to 14, wherein the first end of the optical waveguide is aligned with the optical port; and the optical port is coupled with an optical source operable to transmit a signal, or the optical port is coupled with an optical detector operable to a receive a signal.

In a sixteenth example, a system comprising: an optical interposer comprising: a substrate comprising a first surface; a second surface opposite the first surface; and a hole extending from the first surface to the second surface, the hole comprising a first sidewall;

a first optical interconnect between the first surface and the second surface, and comprising a first end at the first sidewall; and a photonic integrated circuit (PIC) within the hole, the PIC comprising a second sidewall; and a first optical port at the second sidewall; wherein the second sidewall is proximate to the first sidewall, and the first end of the first optical interconnect is proximate to and aligned with the first optical port; a logic integrated circuit (IC) device; and a memory IC device.

In a seventeenth example, the system of example 16, wherein the substrate further comprises: a second optical interconnect integral with the substrate and between the first surface and the second surface, the second optical interconnect comprising a second end at the first sidewall; wherein the PIC further comprises a second optical port at the second sidewall, and a second end of the second optical interconnect is proximate to and aligned with the second optical port; and wherein the first optical port is coupled with an optical source operable to transmit a signal, and the second optical port is coupled with an optical detector operable to a receive a signal.

In an eighteenth example, the system of example 16 or 17, wherein the substrate further comprises a recess at the first surface, the recess comprising a third sidewall, wherein the third sidewall comprises a second end of the first optical interconnect; and wherein the optical interposer further comprises a device, within the recess, the device comprising: a fourth sidewall proximate to the third sidewall; a third surface; a first optical interface; a second optical interface; and a waveguide coupling the first optical interface with the second optical interface, wherein the first optical interface is at the fourth sidewall and proximate to the second end of the optical waveguide, and the second optical interface is at the third surface and comprises a connector.

In a nineteenth example, a method comprising: determining location data by measuring a location of a first device relative to a location of a substrate, wherein: the substrate comprises a first surface; a second surface opposite the first surface; and a hole extending from the first surface to the second surface, the hole comprising a first sidewall; and the device is within the hole and comprises a second sidewall; and an optical port at the second sidewall, wherein the second sidewall is proximate to the first sidewall; providing the location data to a laser tool; writing an optical waveguide in the substrate by the laser tool using the location data, wherein the optical waveguide is between the first surface and the second surface, and comprises a first end at the first sidewall; and the first end is proximate to and aligned with the optical port.

In a twentieth example, the method of example 19, further comprising: placing a second device in a recess in the substrate, wherein the recess comprises a third sidewall, the third sidewall comprises a second end of the optical waveguide, and the second device comprises a socket at a third surface to receive an optical plug or an optical plug for insertion into a socket.

However, the above embodiments are not limited in this regard and, in various implementations, the above embodiments may include the undertaking of only a subset of such features, undertaking a different order of such features, undertaking a different combination of such features, and/or undertaking additional features than those features explicitly listed. The scope of the invention should therefore be determined with reference to the appended claims, along with the full scope of equivalents to which such claims are entitled.

What is claimed is:

1. A device comprising:

a substrate comprising:

a patterned glass;

a first surface;

a second surface opposite the first surface;

an optical waveguide integral within the substrate; and a hole extending from the first surface to the second surface, the hole comprising a first sidewall, wherein the optical waveguide is between the first surface and the second surface, and comprises a first end at the first sidewall; and an integrated circuit (IC) die within the hole, the IC die comprising:

a second sidewall; and an optical port at the second sidewall, wherein the second sidewall is proximate to the first sidewall, and the first end of the optical waveguide is proximate to the optical port.

2. The device of claim 1, wherein the IC die further comprises:

a first fiducial marker;

a third surface; and a fourth surface opposite the third surface;

wherein the second sidewall is orthogonal to the third surface, and the first fiducial marker is at the third surface.

3. The device of claim 2, wherein the substrate further comprises a second fiducial marker at the first surface or the second surface.

4. The device of claim 1, wherein the substrate further comprises a recess at the first surface to receive another device, the recess comprising a third sidewall, wherein the third sidewall comprises a second end of the optical waveguide.

5. The device of claim 4, wherein the device further comprises:

the other device, wherein the other device is within the recess and comprises:

a fourth sidewall proximate to the third sidewall;

a third surface;

a first optical interface;

a second optical interface; and an interconnect coupling the first optical interface with the second optical interface, wherein the first optical interface is at the fourth sidewall and proximate to the second end of the optical waveguide, and the second optical interface is at the third surface.

6. The device of claim 5, wherein the second optical interface comprises:

a socket to receive an optical plug; or an optical plug for insertion into a socket.

7. The device of claim 1, wherein the IC die further comprises:

a third surface;

a fourth surface opposite the third surface, wherein the second sidewall is orthogonal to the third surface; and a hardware interface comprising a plurality of electrically conductive contacts at the third surface.

8. The device of claim 7, wherein the IC die further comprises a dielectric material adjoining the plurality of electrically conductive contacts, and wherein the dielectric material is patterned to expose a first fiducial marker on the third surface of the IC die.

9. The device of claim 7, wherein the IC die further comprises a thermally conductive layer, and wherein the fourth surface is an outside surface of the device.

10. The device of claim 1, further comprising a mold material between the IC die and the substrate.

11. The device of claim 1, further comprising a dielectric material layer contacting the second surface of the substrate, wherein the dielectric material layer comprises an artifact of a grinding process or a polishing process.

12. The device of claim 1, further comprising an index matching material between the optical port and the substrate.

13. The device of claim 1, wherein the IC die further comprises a laser.

14. The device of claim 1, wherein the first end of the optical waveguide is aligned with the optical port; and the optical port is coupled with an optical source operable to transmit a signal, or the optical port is coupled with an optical detector operable to a receive a signal.

15. A system comprising:

an optical interposer comprising:

a substrate comprising:

a first surface; a second surface opposite the first surface;

a hole extending from the first surface to the second surface, the hole comprising a first sidewall; and a recess at the first surface, the recess comprising a second sidewall;

a first optical waveguide between the first surface and the second surface, and comprising a first end at the first sidewall and a second end at the second sidewall;

a device, within the recess, the device comprising:

a third sidewall proximate the second sidewall; and a second optical waveguide coupling a first optical interface with a second optical interface, wherein the first optical interface is at the third sidewall and proximate to the second end of the first optical waveguide, and the second optical interface is at a third surface of the device;

a photonic integrated circuit (PIC) within the hole, the PIC comprising a fourth sidewall; and a first optical port at the fourth sidewall; wherein the fourth sidewall is proximate to the first sidewall, and the first end of the first optical waveguide is proximate to and aligned with the first optical port;

a logic integrated circuit (IC) device; and a memory IC device.

16. The system of claim 15, wherein the substrate further comprises:

a second optical waveguide integral with the substrate and between the first surface and the second surface, the second optical waveguide comprising a second end at the first sidewall;

wherein the PIC further comprises a second optical port at the second sidewall, and a second end of the second optical waveguide is proximate to and aligned with the second optical port; and wherein the first optical port is coupled with an optical source operable to transmit a signal, and the second optical port is coupled with an optical detector operable to a receive a signal.

17. The system of claim 15, wherein the second optical interface comprises a connector, and the third surface is opposite the third sidewall or orthogonal to the third sidewall.

* * * * *